(12) United States Patent
Amemiya et al.

(10) Patent No.: US 7,715,709 B2
(45) Date of Patent: May 11, 2010

(54) OPTICAL SWITCH AND NETWORK SYSTEM INCLUDING THE SAME

(75) Inventors: Kouichirou Amemiya, Kawasaki (JP); Takao Naito, Kawasaki (JP); Toshiki Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1211 days.

(21) Appl. No.: 10/914,220

(22) Filed: Aug. 10, 2004

(65) Prior Publication Data

US 2005/0213971 A1 Sep. 29, 2005

(30) Foreign Application Priority Data

Mar. 24, 2004 (JP) ............................. 2004-086932

(51) Int. Cl.
*H04J 14/00* (2006.01)
(52) U.S. Cl. .......................................... 398/12; 398/45
(58) Field of Classification Search ............... 398/12, 398/45
See application file for complete search history.

(56) References Cited

U.S. PATENT DOCUMENTS

| | | | | |
|---|---|---|---|---|
| 5,606,669 | A * | 2/1997 | Bertin et al. ................. | 709/223 |
| 5,940,771 | A * | 8/1999 | Gollnick et al. ............. | 455/517 |
| 6,108,308 | A * | 8/2000 | Flavin et al. ................. | 370/238 |
| 6,256,295 | B1 * | 7/2001 | Callon ......................... | 370/254 |
| 6,304,347 | B1 * | 10/2001 | Beine et al. .................... | 398/38 |
| 6,694,070 | B2 * | 2/2004 | Gottlieb et al. ............... | 385/16 |
| 6,704,301 | B2 * | 3/2004 | Chari et al. .................. | 370/351 |
| 6,980,736 | B1 * | 12/2005 | Fee et al. ..................... | 398/19 |
| 6,990,350 | B2 * | 1/2006 | Davis et al. ............... | 455/452.2 |
| 7,139,482 | B2 * | 11/2006 | Suzuki et al. ................. | 398/57 |
| 7,212,742 | B2 * | 5/2007 | Peddanarappagari et al. .. | 398/38 |
| 7,313,328 | B2 | 12/2007 | Oki et al. | |
| 7,372,806 | B2 | 5/2008 | Suemura ..................... | 370/223 |
| 7,471,625 | B2 | 12/2008 | Suemura ..................... | 370/223 |

(Continued)

FOREIGN PATENT DOCUMENTS

JP 2003-143145 5/2003

(Continued)

OTHER PUBLICATIONS

Ibanez, G. et al. "Alternative multiple spanning tree protocol (AMSTP) for optical Ethernet backbones." Proceedings of the 29th Annual IEEE International Conference on Local Computer Networks, 2004. Nov. 16-18, 2004:744-751.*

(Continued)

*Primary Examiner*—Leslie Pascal
(74) *Attorney, Agent, or Firm*—Staas & Halsey LLP

(57) ABSTRACT

The optical switch, having a plurality of ports capable of switching optical signal routes in a network in the form of light, includes a detection means for detecting information in regard to the transmission condition of an optical signal passing through each port; and a control means for exchanging the transmission condition information between each switch and controlling the ports, so as to select one route from among a plurality of routes transmitting the optical signal based on the difference of transmission condition information between the relevant switches. The transmission condition information is the power of the optical signal. When the difference between each switch exists, or when at least one switch intervenes in the middle of the transmission route, by selecting a transmission route which minimizes accumulated differences among the switches, configuring a tree structure conventionally performed through manual operation can be set automatically in an optical network system.

12 Claims, 11 Drawing Sheets

U.S. PATENT DOCUMENTS

| | | | |
|---|---|---|---|
| 2002/1012633 | * | 9/2002 | Uematsu et al. ............. 359/110 |
| 2003/0043756 A1 | * | 3/2003 | Reynders et al. ............ 370/254 |
| 2003/0081283 A1 | * | 5/2003 | Ishizuka et al. ............ 359/124 |
| 2003/0147645 A1 | | 8/2003 | Imajuku et al. |
| 2003/0161633 A1 | | 8/2003 | Oki et al. |

FOREIGN PATENT DOCUMENTS

| | | |
|---|---|---|
| JP | 2003-158527 | 5/2003 |
| JP | 2003-209518 | 7/2003 |
| JP | 2003-234823 | 8/2003 |
| JP | 2003-258886 | 9/2003 |
| JP | 2003-283506 | 10/2003 |

OTHER PUBLICATIONS

Japanese Office Action issued on Mar. 10, 2009 in corresponding Japanese Patent Application 2004-086932.

802.1D, IEEE Standard for Local and Metropolitan Area Networks, Media Access Control (MAC) Bridges, Jun. 9, 2004.

Japanese Office Action mailed Nov. 17, 2009 and issued in corresponding Japanese Patent Application 2004-086932.

* cited by examiner

FIG. 7  PRIOR ART

| BYTE | FIELD | DESCRIPTION |
|---|---|---|
| 2 | PROTOCOL ID | IDENTIFIER. NORMALLY 0. |
| 1 | VERSION | 0 IN THE ORDINARY STP. |
| 1 | MESSAGE TYPE | TYPE OF BPDU: 0x00=ORDINARY BPDU. 0x80=TCN BPDU NOTIFYING CHANGE OF TOPOLOGY. |
| 1 | FLAGS | FLAG USED WHEN TOPOLOGY IS CHANGED. |
| 2 | ROOT BRIDGE PRIORITY | ROOT BRIDGE PRIORITY |
| 6 | ROOT BRIDGE ID | ROOT BRIDGE ID |
| 4 | PATH COST | PATH COST. TOTAL PATH COSTS TO THE ROOT BRIDGE. |
| 2 | BRIDGE PRIORITY | BRIDGE PRIORITY |
| 6 | BRIDGE ID | BRIDGE ID |
| 1 | PORT PRIORITY | PORT PRIORITY |
| 1 | PORT ID | PORT ID |
| 2 | MESSAGE AGE | SURVIVAL TIME OF BPDU. |
| 2 | MAX AGE | MAXIMUM SURVIVAL TIME OF THE ROUTE INFORMATION. |
| 2 | HELLO TIME | BPDU TRANSMISSION INTERVAL. |
| 2 | FORWARD DELAY | TIME FOR STATE TRANSITION TO A FORWARDING STATE (TRANSFERRING) |

BPDU (BRIDGE PROTOCOL DATA UNIT) FORMAT

FIG. 8

| BYTE | FIELD | DESCRIPTION |
|---|---|---|
| 4 | PORT INPUT POWER | INPUT LIGHT POWER OF THE PORT |
| 4 | PORT OUTPUT POWER | OUTPUT LIGHT POWER OF THE PORT |

BPDU FIELD TO BE ADDED TO

FIG. 9

| BYTE | FIELD | DESCRIPTION |
|---|---|---|
| 2 | PROTOCOL ID | IDENTIFIER. NORMALLY 0. |
| 1 | VERSION | 0 IN THE ORDINARY STP. |
| 1 | MESSAGE TYPE | TYPE OF BPDU: 0X00=ORDINARY BPDU, 0X80=TCN BPDU NOTIFYING CHANGE OF TOPOLOGY. |
| 1 | FLAGS | FLAG USED WHEN TOPOLOGY IS CHANGED. |
| 2 | ROOT BRIDGE PRIORITY | ROOT BRIDGE PRIORITY |
| 6 | ROOT BRIDGE ID | ROOT BRIDGE ID |
| 4 | PATH COST | PATH COST. TOTAL PATH COSTS TO THE ROOT BRIDGE. |
| 2 | BRIDGE PRIORITY | BRIDGE PRIORITY |
| 6 | BRIDGE ID | BRIDGE ID |
| 1 | PORT PRIORITY | PORT PRIORITY |
| 1 | PORT ID | PORT ID |
| 2 | MESSAGE AGE | SURVIVAL TIME OF BPDU. |
| 2 | MAX AGE | MAXIMUM SURVIVAL TIME OF THE ROUTE INFORMATION. |
| 2 | HELLO TIME | BPDU TRANSMISSION INTERVAL. |
| 2 | FORWARD DELAY | TIME FOR STATE TRANSITION TO A FORWARDING STATE (TRANSFERRING). |
| 4 | PORT INPUT POWER | INPUT LIGHT POWER OF THE PORT |
| 4 | PORT OUTPUT POWER | OUTPUT LIGHT POWER OF THE PORT |

EXTENDED BPDU FORMAT

FIG. 10

| | ① | ②③④ | ⑤ | ⑥ | ⑦ | ⑧ | ⑨ | ⑩⑪ | ⑫ | ⑬ | ⑭ | ⑮ | ⑯ | ⑰ |
|---|---|---|---|---|---|---|---|---|---|---|---|---|---|---|
| TRANSMISSION | | | 1 | a | 0 | 1 | a | 11 | | | | | −6 | 0 |
| RECEPTION | | | 2 | b | 0 | 2 | b | 11 | | | | | −6 | 0 |

EXTENDED BPDU TRANSMITTED/RECEIVED AT PORT a1

① PROTOCOL ID
② VERSION
③ MESSAGE TYPE
④ FLAGS
⑤ ROOT BRIDGE PRIORITY
⑥ ROOT BRIDGE ID
⑦ PATH COST
⑧ BRIDGE PRIORITY
⑨ BRIDGE ID
⑩ PORT PRIORITY
⑪ PORT ID
⑫ MESSAGE AGE
⑬ MAX AGE
⑭ HELLO TIME
⑮ FORWARD DELAY
⑯ PORT INPUT POWER
⑰ PORT OUTPUT POWER

FIG. 11

| | ① | ② ③ ④ | ⑤ | ⑥ | ⑦ | ⑧ | ⑨ | ⑩ ⑪ | ⑫ | ⑬ | ⑭ | ⑮ | ⑯ | ⑰ |
|---|---|---|---|---|---|---|---|---|---|---|---|---|---|---|
| TRANSMISSION | | | 2 | b | 0 | 2 | b | 1 1 | | | | | −6 | 0 |
| RECEPTION | | | 1 | a | 0 | 1 | a | 1 1 | | | | | −6 | 0 |

EXTENDED BPDU TRANSMITTED/RECEIVED AT PORT b1

① PROTOCOL ID
② VERSION
③ MESSAGE TYPE
④ FLAGS
⑤ ROOT BRIDGE PRIORITY
⑥ ROOT BRIDGE ID
⑦ PATH COST
⑧ BRIDGE PRIORITY
⑨ BRIDGE ID
⑩ PORT PRIORITY

⑪ PORT ID
⑫ MESSAGE AGE
⑬ MAX AGE
⑭ HELLO TIME
⑮ FORWARD DELAY
⑯ PORT INPUT POWER
⑰ PORT OUTPUT POWER

OPTICAL SWITCH AND NETWORK SYSTEM INCLUDING THE SAME

FIELD OF THE INVENTION

The present invention relates to an optical switch for switching optical signals and a network system provided with the optical switch.

BACKGROUND OF THE INVENTION

Ethernet which works on layer two (including Fast Ethernet, Gigabit Ethernet, and 10 Gigabit Ethernet) has been used in a local area network (LAN). At present, application area of layer-2 Ethernet expands to a metro area network (MAN) and a wide area network (WAN) as well as LAN, as can be seen wide area Ethernet services becoming popular. Further, application of a storage area network (SAN) to a metro area is being discussed. Moreover, since data processing speed has increased as the Internet proliferates, optical interface such as fiber channel for use in Gigabit Ethernet, 10 Gigabit Ethernet and SAN has been standardized. In the near future, it is highly probable that a network using an optical switch becomes popular by use of ultra high-speed interface of 10 Gigabit Ethernet class, in which optical signals are being switched in the form of light.

In an electric switch, the spanning tree protocol (STP) is used to secure network redundancy while avoiding a loop phenomenon. STP is a method of configuring a tree structure in a switching network working on layer 2, extending to the entire switches in the network while only one route is existent for each of the entire destinations. With this, while a redundant route is secured even in the event of a failure, logical wiring can be determined avoiding network stoppage caused by a packet loop.

In STP, a switch located at the center of the tree is termed root bridge. As center switch, a switch having a minimum bridge ID (identification number) value is selected. In other switches than the root bridge, a root path cost against the root bridge is calculated. Also, a route having the minimum root path cost is set to a forwarding state (a state transmitting data frames), and other routes having greater root path costs than the above is set to a blocking state (a state suspending transmission of data frames). The path cost of a link between each switch is obtained from the link transmission speed. A port in each switch is shifted from a blocking state, through a listening state and a learning state, to a forwarding state. The above each state will be explained in the following FIG. 1.

FIG. 1 shows a diagram illustrating state transitions in each port of a switch. Each port can take the blocking state, the listening state, the learning state, the forwarding state, and further a disable state. In the blocking state, data traffic is neither transmitted nor received. Namely, data traffic is discarded, and only BPDU (bridge protocol data unit) is received. In the listening state, data traffic is neither transmitted nor received, and the incoming data traffic is discarded, while BPDU is transmitted and received to form an STP tree topology. In the learning state, data traffic is neither transmitted nor received, and the incoming data traffic is discarded. Learning MAC address and generating an MAC address table are performed in this state. Namely, each MAC address provided in the equipment connected to each switch port is retained in this table, correspondingly to each port. When the state is shifted to this learning state, data frames become ready for transfer. In the forwarding state, it becomes possible to transmit/receive both data traffic and BDPU. The disable state is a state other than the above four states, that is, each port stays ineffective or STP is inoperable. Transitions between each state are performed based on each condition corresponding to reference numbers (1), (2), (3), (4) and (5) attached to each arrow shown in FIG. 1. More specifically, the reference number (1) denotes a case that the port becomes either effective or initialized, the reference number (2) denotes a case of the port becoming ineffective, the reference number (3) denotes a case of the port being selected as designated port or root port, the reference number (4) is a case of the port being selected as blocking port, and the reference number (5) is a case when a predetermined time (forward delay: time for shifting to the learning state or the forwarding state) has elapsed.

FIGS. 2A, 2B show diagrams illustrating an exemplary STP tree topology configuration. In a network having physical topology shown in FIG. 2A, logical topology shown in FIG. 2B is structured by exchanging BPDU to determine a route. The procedure for structuring this topology is explained below.

(1) Selecting a Root Bridge

First, a switch having the minimum value of bridge ID (a 64-bit numeral constituted of 16-bit 'priority' combined with 48-bit MAC address of each switch) is selected as root bridge.

(2) Selecting Root Ports

In the switches other than the root bridge, a root port, which is a port positioned nearest to the root bridge, is selected. First, a BPDU having a root path cost=0 is transmitted from the root bridge toward switches located downstream. When a switch receives the BPDU, the switch adds the path cost of the port that has received the BPDU, and transfers the new BPDU further to the downstream switches. By repeating the above procedure, each switch receives a plurality of BPDU. The port having received the BPDU including the least root path cost value is selected as root port.

(3) Selecting Designated Ports

All ports in the root bridge are selected as designated ports without exception. Further, among the ports in each segment (where a segment is a link between switches), a port having a shortest route to the root bridge is selected as designated port.

(4) Setting Forwarding Ports

The ports having been selected as root port and designated port are set as forwarding ports.

(5) Setting Blocking Ports

The ports having been selected neither root port nor designated port are set as blocking ports.

Through the above procedure, logical topology having a tree structure (i.e. tree topology) by STP is structured in regard to the network constituted of electric switches.

PROBLEMS TO BE SOLVED BY THE INVENTION

Because opto-electric conversion of ultra high speed signals is highly difficult, an optical switch capable of switching the routes in the form of light without performing opto-electric conversion is a key technology for optical networks. As compared with an electric switch, the optical switch has such features as being free from protocols (Ethernet or Fiber Channel), and capable of passing signals at arbitrary bit rates. Because of these features, the optical switch is considered as a switch having dominant possibility for use in the future network. However, in the optical switch, exchanging BPDU control frames employed in STP has not been taken into account, and therefore it is difficult to implement the STP function. As a result, in a network constituted of a plurality of optical switches, an unintended packet loop may possibly be produced. Furthermore, it is not possible to analyze BPDU even if BPDU is transmitted, because presently the optical switch performs switching without inspecting the contents of BPDU. For the above reason, configuring a tree structure is mainly performed by manual operation, which compels consumption of a large amount of time, as well as human costs.

SUMMARY OF THE INVENTION

Accordingly, it is an object of the present invention to provide an optical switch capable of automatic configuration of transmission routes of a tree structure, and a network system constituted of the above optical switch.

In order to attain the above-mentioned object, according to the present invention, there is disclosed a first optical switch having a plurality of ports and being capable of switching optical signal routes in the form of light. The first optical switch includes: a detection means detecting information in regard to a transmission condition of an optical signal passing through each port; and a control means exchanging the above-mentioned information in regard to the transmission condition between each switch, and controlling each port so that a single route is selected from among the plurality of routes on which optical signals are transmitted, based on the difference of the information in regard to the transmission condition between each switch.

In the first optical switch, for example, the information in regard to the transmission condition is optical signal power. A transmission route either having a minimum difference of the information between each switch, or when at least one switch intervenes in the middle of the transmission route, having a minimum accumulation of the differences between each switch, is selected.

In order to attain the above-mentioned object, in a plurality of optical switches each having a plurality of ports and being capable of switching optical signal routes in the form of light, there is disclosed a second optical switch according to the present invention, which includes a detection means detecting information in regard to a transmission condition of an optical signal input into each port; and a control means controlling each port so that a single route is selected from among the plurality of routes on which the optical signals are transmitted, based on the above-mentioned information in regard to the transmission condition of the optical signal detected in each port.

In the second optical switch, for example, the information in regard to the transmission condition is optical signal power, and a transmission route through which an optical signal is input into a port having received the maximum optical signal power is selected.

Preferably, the control means transmits and receives the information in regard to the transmission condition between each switch, using an extended BPDU format having an additional information field in regard to the transmission condition, which is added to the bridge protocol data unit (BPDU) format of the spanning tree protocol (STP). A tree topology with STP is structured through the port control performed by the control means.

Also, the control means transmits and receives the information in regard to the transmission condition via a signal line network different from the network constituting the optical signal transmission routes.

Further, there are disclosed a network system constituted of the above-mentioned optical switch in accordance with the present invention, and a route setting method performed by the optical switch.

The effects of the present invention will be summarized in the following:

In an electric switch, the tree structure is configured using STP. However, in the conventional optical switch, it is not possible to read the signal contents because switching is carried out in the form of light. Therefore, it is not possible to configure the tree structure. According to the present invention, there is provided a method for configuring the tree structure in an optical network by the use of light power (intensity) information. This enables automatic setting of the tree structure in the optical network system, which has been performed through manual operation in the conventional method, and reduction in terms of time and human costs can be achieved. Further, in the event of a failure, failure detection can be attained earlier by monitoring the light power, and as a result, switchover to a redundant route can be achieved faster than in the case when the electric switches are used.

Further scopes and features of the present invention will become more apparent by the following description of the embodiments with the accompanied drawings.

BRIEF DESCRIPTION OF THE DRAWINGS

FIG. 7 shows a diagram illustrating a BPDU format in STP for electric switches.

FIG. 8 shows exemplary fields newly added to the BPDU format.

FIG. 9 shows an exemplary configuration of an extended BPDU format according to an embodiment of the present invention.

FIG. 10 shows exemplary frames transmitted and received on a port a1.

FIG. 11 shows exemplary frames transmitted and received on a port b1.

DETAILED DESCRIPTION OF THE PREFERRED EMBODIMENTS

The preferred embodiment of the present invention is described herein after referring to the charts and drawings. However, it is noted that the scope of the present invention is not limited to the embodiments described below.

According to an embodiment of the present invention, when structuring a logical tree structure of a network constituted of a plurality of optical switches, optical signal power (light intensity) is monitored, and an optical path cost is calculated based on optical power loss, without converting an optical signal transmitting between each optical switch to an electric signal. Based on the calculated optical path cost, logical topology of a tree structure using optical switches is constructed.

Figure 1:
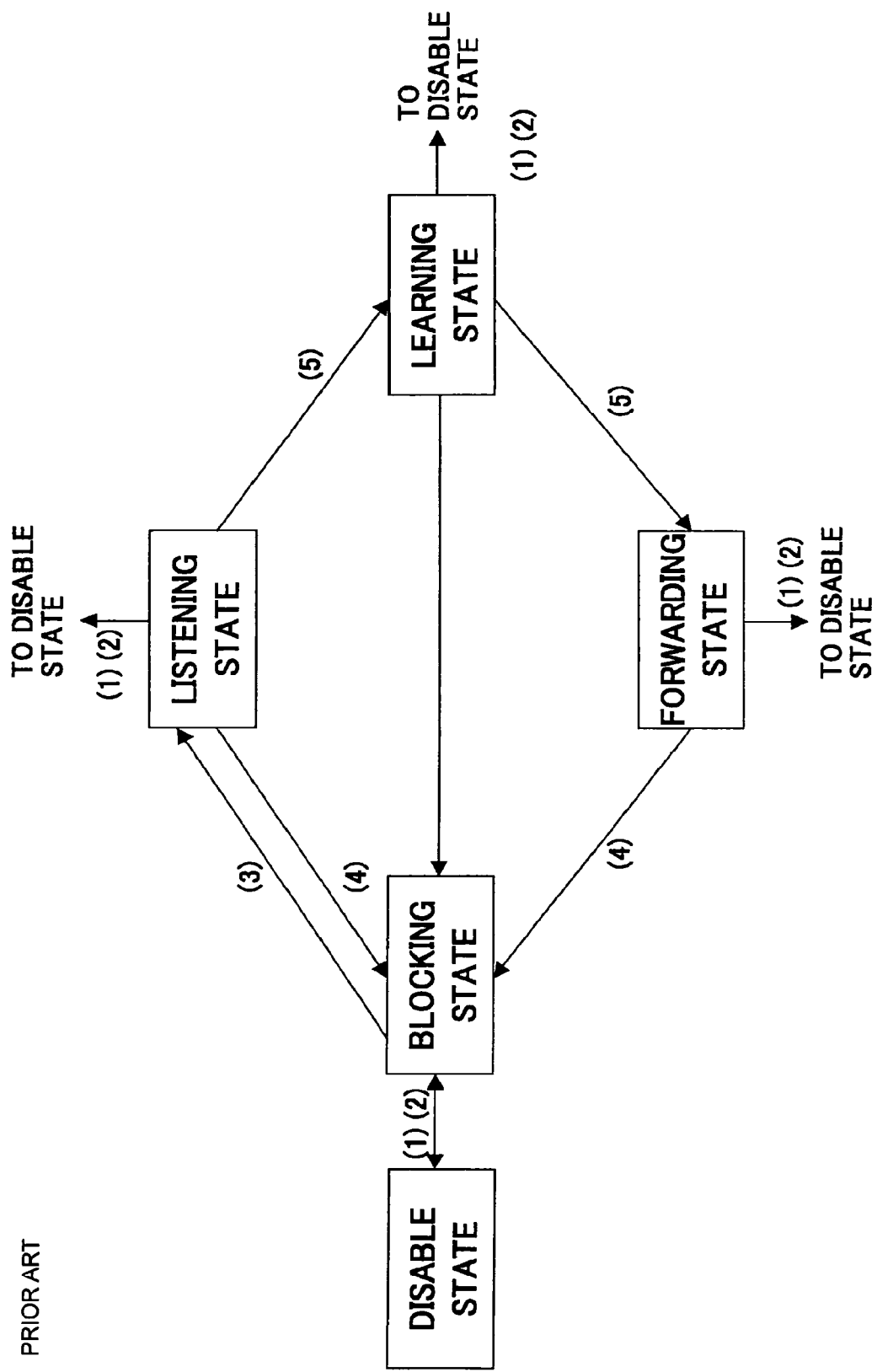
FIG. 1 shows a diagram illustrating state transitions in each port of a switch.
Figure 2B:
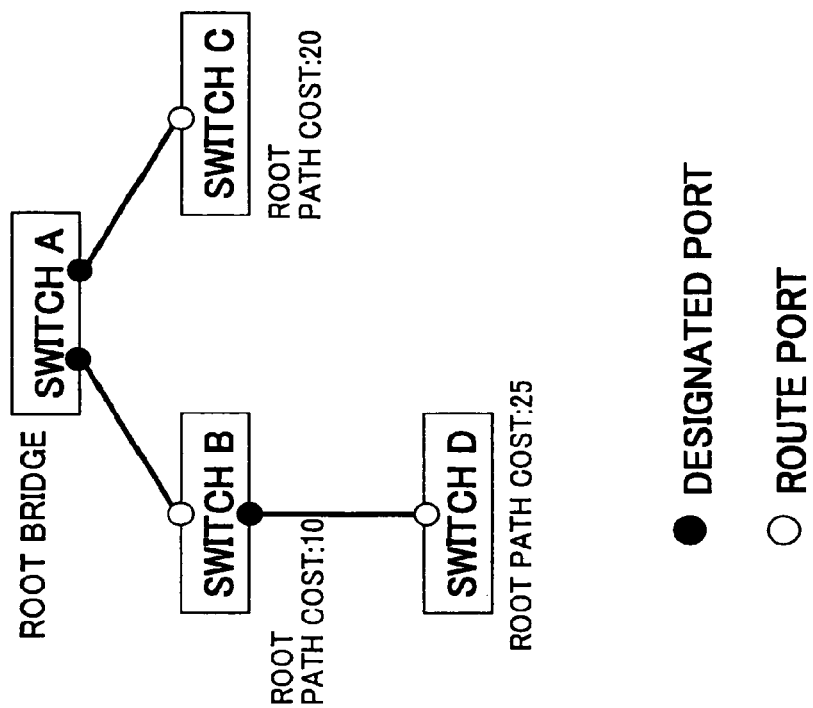
FIGS. 2A, 2B show diagrams illustrating an exemplary STP tree topology configuration.
Figure 2A:
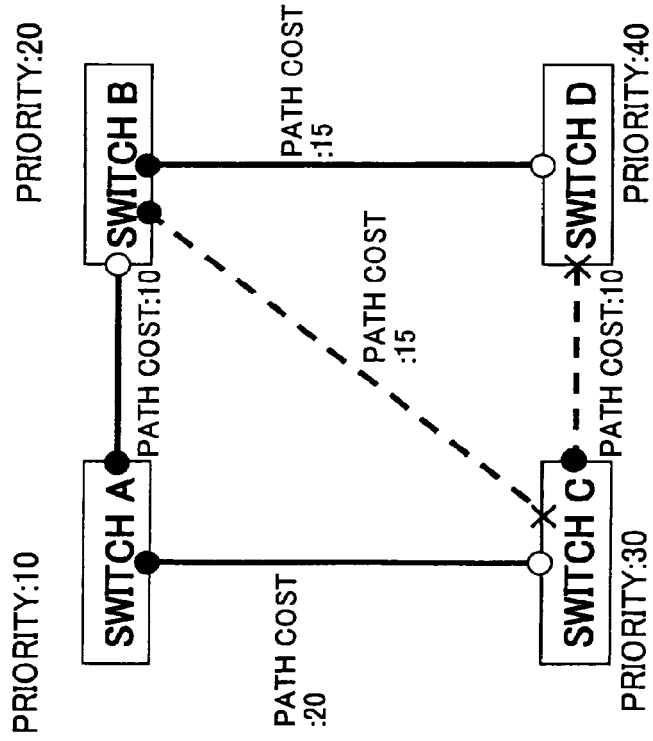
Figure 3:
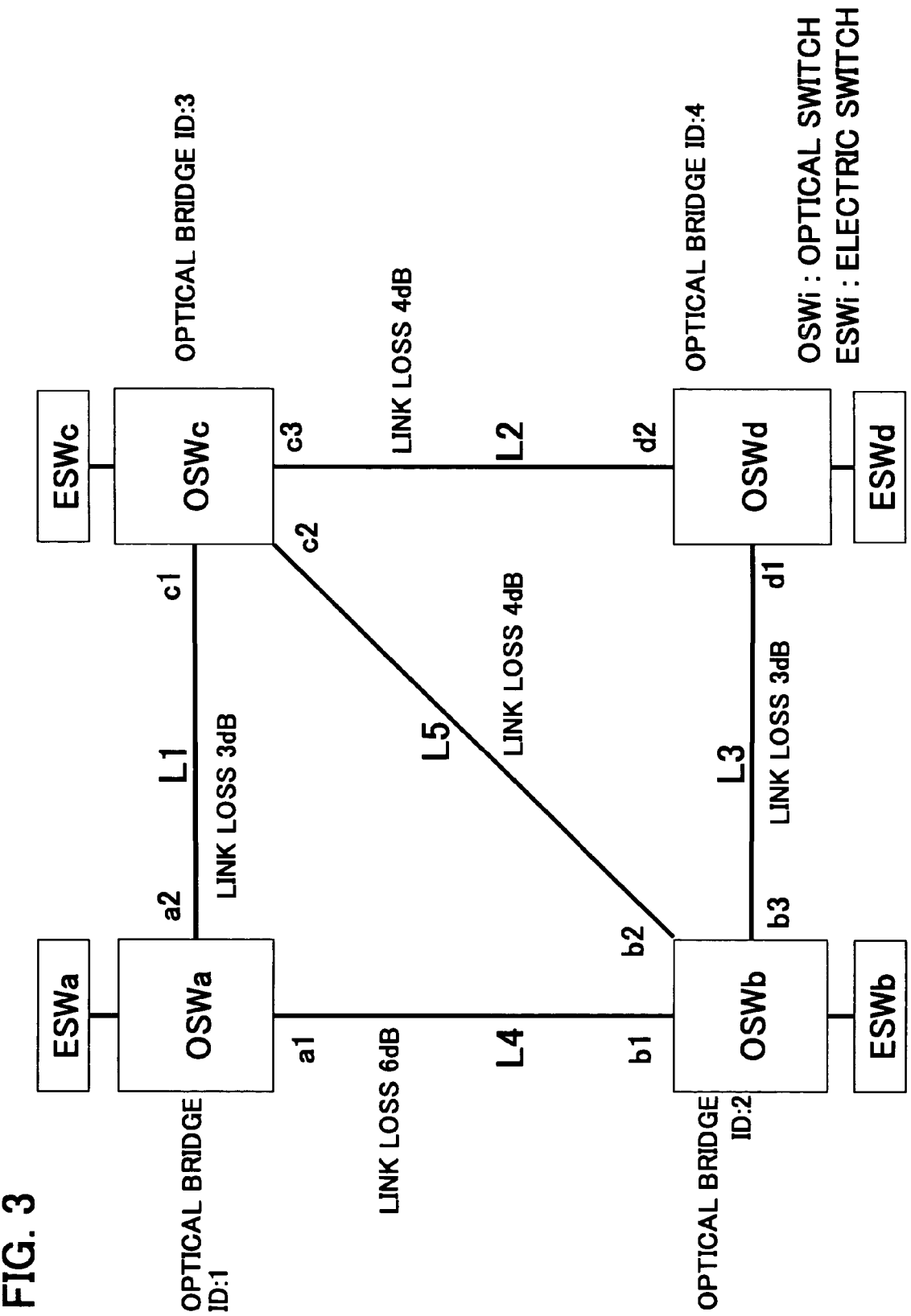
FIG. 3 shows an exemplary network configuration (physical topology) constituted of a plurality of optical switches according to an embodiment of the present invention.

FIG. 3 shows an exemplary network configuration (physical topology) constituted of a plurality of optical switches according to the embodiment of the present invention. The network shown in FIG. 3 is constituted of four optical switches OSWa (optical bridge ID: 1), OSWb (optical bridge ID: 2), OSWc (optical bridge ID: 3), and OSWd (optical bridge ID: 4). To these optical switches, electric switches ESWa, ESWb, ESWc and ESWd are connected, respectively. Further, optical switch OSWa has ports a1, a2, optical switch OSWb has ports b1, b2, optical switch OSWc has ports c1, c2, and optical switch OSWd has ports d1, d2, respectively.

Optical switches OSWa and OSWb are connected by an optical link L4 having an assumed path cost (optical link path cost) of, for example, 6 (dB). The optical link path cost is a difference of the power loss in the optical link concerned. Similarly, OSWa and OSWc are connected by an optical link L1 having an assumed link loss of 3 (dB), OSWc and OSWd are connected by an optical link L2 having an assumed link loss of 4 (dB), and OSWb and OSWd are connected by an optical link L3 having an assumed link loss of 3 (dB), OSWc and OSWb are connected by an optical link L5 having an assumed optical link path cost of 4 (dB). Here, each link is constituted of an upward channel and a downward channel. Each link loss shown in FIG. 3 is, for example, an average optical link loss on the upward channel and the downward channel.

Figure 4:
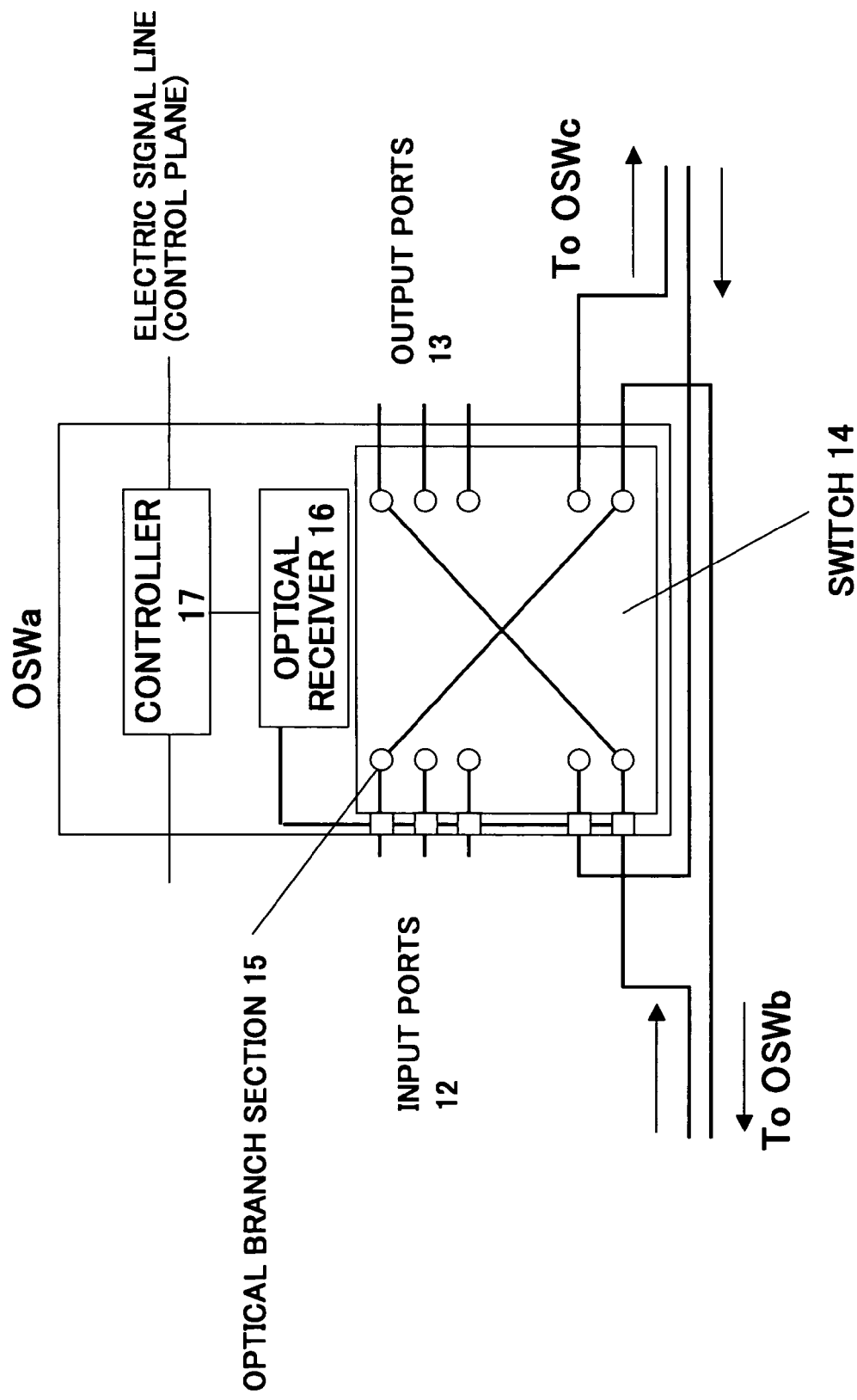
FIG. 4 shows a diagram illustrating an internal configuration of an optical switch according to an embodiment of the present invention.

FIG. 4 shows a diagram illustrating an internal configuration of an optical switch according to the embodiment of the present invention. As an example, the internal configuration of optical switch OSWa is shown. Other switches have internal configurations similar to the above OSWa. OSWa includes a switch 14 that enables switching of a plurality of input ports 12 and a plurality of output ports 13. In addition, OSWa includes: an optical branch section 15 by which a portion of optical signals is made to branch at least from either one of input port 12 and output port 13 (branching from the input port is illustrated in the example shown in FIG. 4); an optical receiver 16 which receives the optical signal having been made to branch, and measures the light power thereof; and a controller 17 which controls port connection based on the light power measured by optical receiver 16 and the light power information acquired from other switches, and determines an optical signal route. Controller 17 acquires optical signal power information measured in other switches, calculates each path cost of the optical link (optical link path cost) between the switches, and performs port switching control. Here, a paired combination of an input port and an output port shown in FIG. 4 corresponds to each single port shown in FIG. 3.

In order to configure network tree topology constituted of optical switches, the following are specified in addition to the above-mentioned optical link path cost, and an optical switch path cost.

(i) As to the optical bridge ID of an optical switch, an arbitrary value is settable. With this, an arbitrary one of the plurality of optical switches constituting the network can be defined as optical root bridge. The optical bridge ID is exchanged between each switch using BPDU, using the control plane described later.

(ii) Power difference (link loss: dB) of the optical signal before and after being transmitted through an optical link is defined as optical link path cost.

(iii) A total amount of the optical link path costs of the optical links existent on the route reaching the optical root bridge through which the optical signal passes is defined as optical root path cost.

Under the above specifications, tree topology of the optical switches is configured by the following procedure.

(1) Selecting an optical root bridge
The optical switch of which optical bridge ID is the smallest value is selected as optical root bridge.

(2) Selecting optical root ports
In each optical switch, by measuring the light power of the received optical signal transmitted from the optical root bridge, optical root path costs of the ports in the optical switch concerned are obtained. The port having the least optical root path cost is set as root port.

(3) Setting optical designated ports
The entire ports of the optical root bridge are determined as optical designated ports. Also, among the ports connected to each optical link, the ports having small optical root path costs are determined as optical designated ports.

(4) Setting optical forwarding ports
The optical root port and the entire ports selected as optical designated port are set as optical forwarding ports.

(5) Setting optical blocking ports
The rest of the ports having been neither selected as optical root port, nor determined as optical designated ports are set as optical blocking ports.

With this procedure, a tree topology in the network constituted of optical switches can be configured. Namely, the tree topology throughout the entire network can be configured autonomously using the above-mentioned procedure performed by each optical switch. In order to actualize the configuration procedure of the tree topology, for example, in addition to a data plane for transmitting data in the network in the form of optical signals, a control plane is prepared to transmit optical path costs obtained from light power. The control plane is a network constituted of signal lines physically different from the data plane. On the control plane, power information of the optical signals on the data plane (light power information) is transmitted in the form of electric signals.

Figure 5:
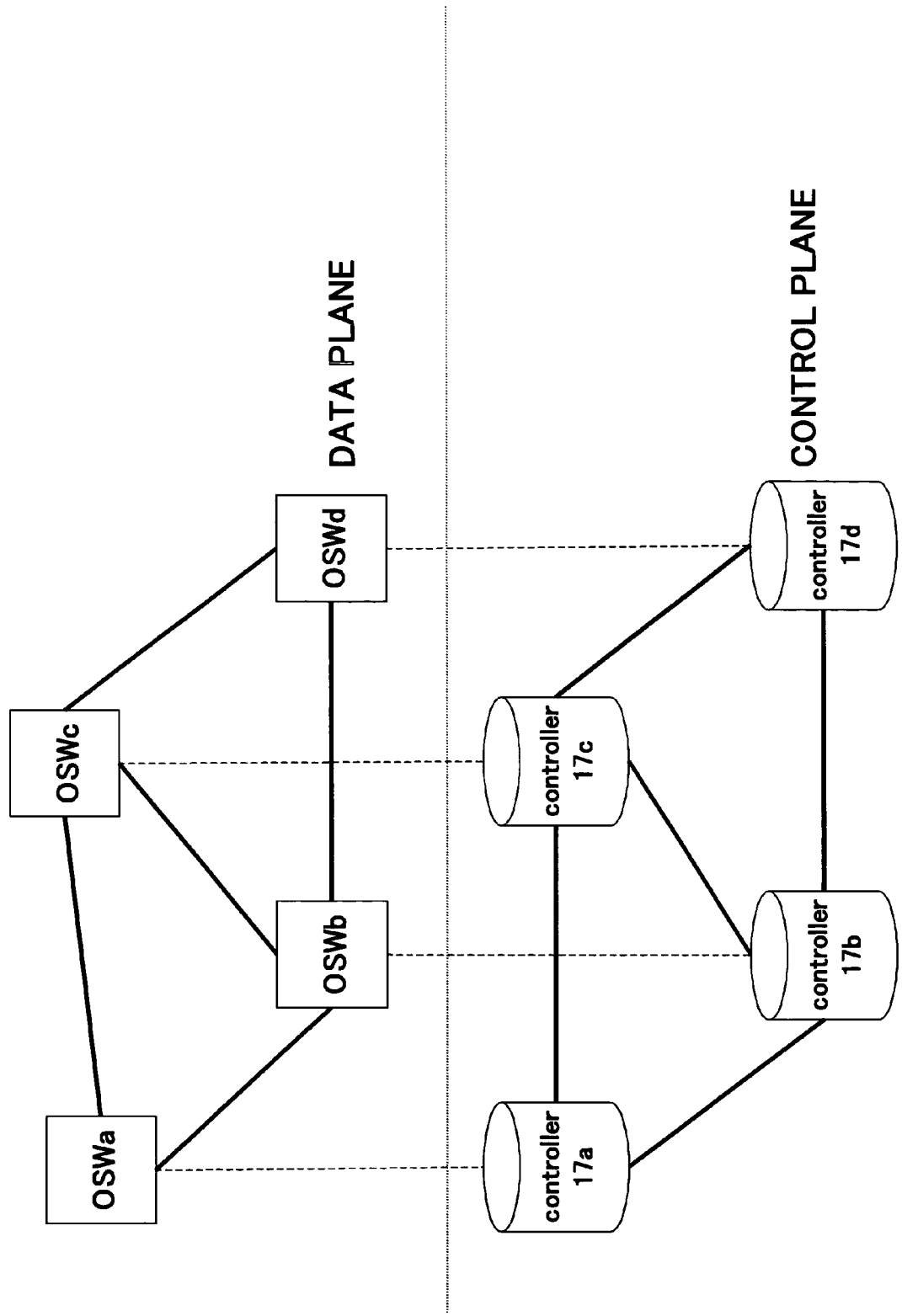
FIG. 5 shows a conceptual diagram of a data plane and a control plane.

FIG. 5 shows a conceptual diagram of the data plane and the control plane. In FIG. 5, a control plane network is provided corresponding to the data plane network transmitting optical signals through each optical switch OSWa, OSWb, OSWc, OSWd. On this control plane, each controller 17a, 17b, 17c, 17d (here, suffixes a, b, c, d are added to identify each controller 17 in the switches) of each optical switch OSWa, OSWb, OSWc, OSWd stores light power information on the control plane, and also exchanges light power information with other optical switches.

Figure 6:
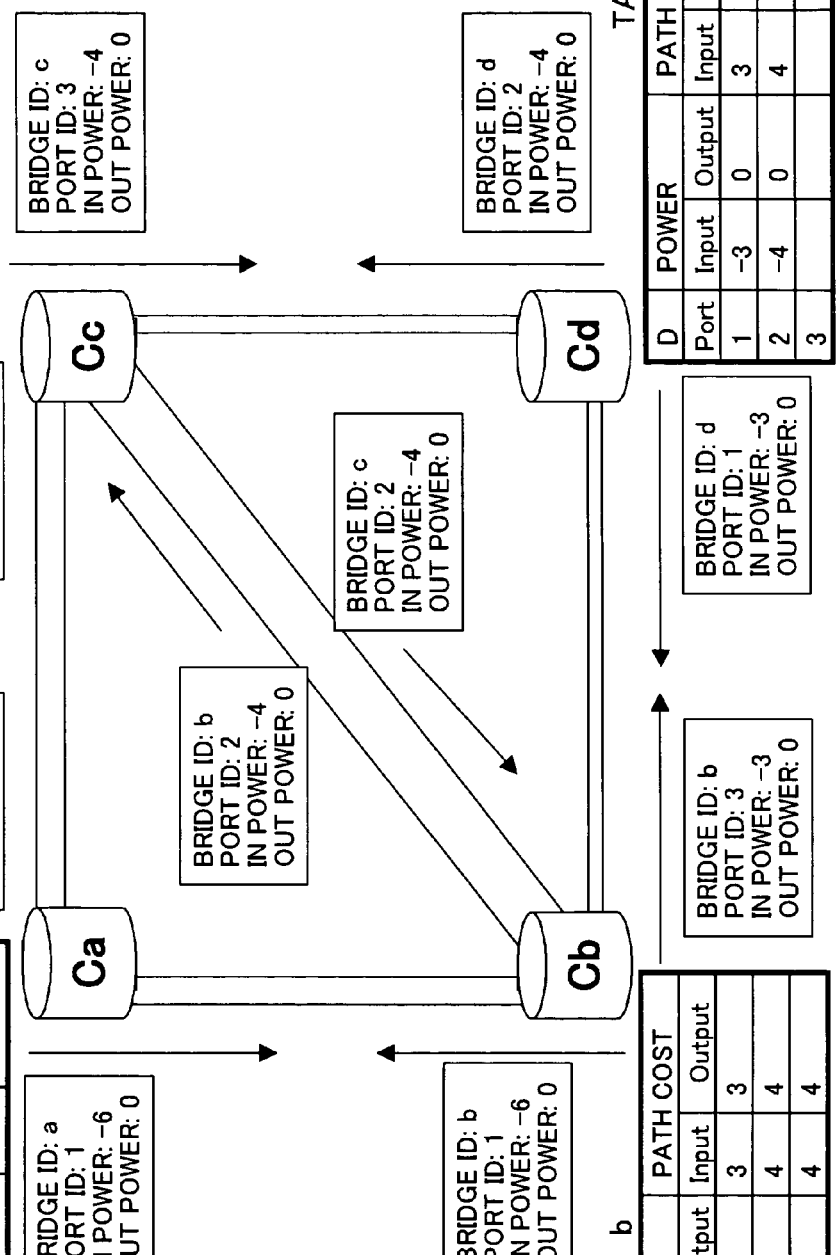
FIG. 6 shows a diagram illustrating exemplary control information stored and transmitted on a control plane.

FIG. 6 shows a diagram illustrating exemplary control information stored and transmitted on the control plane. In FIG. 6, each controller 17 in the switch has a table (table A, table B, table C, table D) stored in a predetermined memory area, having input power and output power (both upward signal power and downward signal power), and optical link path cost as well, corresponding to each port. Each controller 17a, 17b, 17c, 17d in each optical switch OSWa, OSWb, OSWc, OSWd exchanges control information stored in each table using extended BPDU, which is an extended format of BPDU used in STP for electric switches, and will be explained later. Corresponding to each arrow shown in FIG. 6, exemplary control information (light power information) to be exchanged between the switches is shown with respect to both an upward signal and a downward signal.

FIG. 7 shows a diagram illustrating the BPDU format in STP for electric switches. Depending on the BPDU types, values of 'message type' are modified. For STP used in electric switches, there are configuration BPDU (message type: '00000000'b), and topology change notification (TCN) BPDU (message type: '10000000'b).

When configuring tree topology in the network constituted of optical switches, according to the embodiment, it is necessary to assign to each port a value of optical link path cost in each optical switch, prior to configuring tree topology. Therefore, according to the embodiment of the present invention, a new message type is added for this purpose. The name of this new message type is, for example, optical configuration BPDU (message type: other than the values '10000000'b and '00000000'b, for example, '00001000'b). Also, in order to acquire an optical link path cost value, it is necessary to exchange light power information measured in each optical switch. For this purpose, a new field is added in the BPDU format.

FIG. 8 shows exemplary fields newly added to the BPDU format. As shown in FIG. 8, two fields are added: one is "port input power" which denotes an optical signal power value input to the port, and the other is "port output power" which denotes an optical signal power value output from the port.

FIG. 9 shows an exemplary configuration of an extended BPDU format according to the embodiment of the present invention. In the extended BPDU format, the fields shown in FIG. 8 are added to the BPDU format shown in FIG. 7. Each optical switches measures light power values on each input/output port, The measured values are inserted into the field values of "port input power" and "port output power", respectively, and transmitted to other optical switches. Calculation of optical link path cost is performed following transmission and reception of these values.

Taking as an example the optical switch network shown in the above FIG. 3, exchange of light power information between switches and calculation of the optical link path cost are described below.

First, each optical switch sets the message type value of the extended BPDU format to '00001000'b, and transmits the extended BPDU frame to other optical switches. A port a1 of the switch OSWa and a port b1 of the switch OSWb are considered in the following description. FIG. 10 shows exemplary frames transmitted and received on the port a1, while FIG. 11 shows exemplary frames transmitted and received on the port b1. In the switch OSWa, from the information of the reception/transmission light power of the port b1, which has been obtained from the switch OSWb, and the information of reception/transmission light power of the port a1, which is stored in the memory area of controller 17 of the own switch OSWa, the following calculation results are obtained: The optical link path cost of the link on the transmission side (upward link) is 6 dB, and the optical link path cost of the link on the reception side (downward link) is also 6 dB. In this case, since the optical link path costs on both the transmission side and the reception side are identical, the optical link path cost of this link L4 becomes 6 dB. When the optical link path cost on the transmission side differs from the optical link path cost on the reception side, for example, the average value is regarded as the optical link path cost of the optical link concerned.

In the switch OSWb also, the similar calculation is performed, and the result is: the optical link path cost on the transmission side is 6 dB, and the optical link path cost on the reception side is 6 dB. From the above results, both the optical transmission/reception power and the optical link path cost value of each transmission/reception port are stored in the switch OSWa and the switch OSWb, respectively. In a similar manner, light power information is exchanged among the entire switches in the network. Thus, a loss in the link connected to each port, namely the optical link path cost, is retained in each switch (refer to table A, table B, table C, table D).

Then, the optical switch, of which optical link path cost of each port has been determined, sets a message type value of the extended BPDU to the value ('00000000'b) for declaring a configuration BPDU, and performs the aforementioned processing (1) to (5). Thus, logical topology in the optical switch network can be configured.

In the above-mentioned embodiment, by calculating optical link path costs based on light power, a tree structure is configured, in which a transmission route for an optical signal is uniquely determined. However, it may also be possible take an optical signal loss (which is termed optical switch path cost) produced inside each optical switch into consideration, in addition to the optical link path cost. The optical switch itself is also a portion of the optical signal transmission line, and the loss produced while the optical signal is input to the optical switch and output therefrom depends on each switch. Therefore, determining optical signal transmission route in consideration of optical switch path cost, in addition to the optical link path cost, enables more accurate route decision, and configuration of more preferable tree structure as well.

In the above-mentioned embodiment, by measuring the power of the optical signal, configuring the tree structure is performed after each calculates the optical link path cost (and the optical switch path cost) and stores the calculated path cost. However, it is also possible to configure the tree structure without calculating the optical link path cost on a link-by-link basis. More specifically, to determine the routes extending from the root bridge to other switches successively after determining the root bridge, the root bridge outputs optical signals using the entire transmission routes connecting between the root bridge and an object switch for route selection (route selection object switch). The route selection object switch determines the port having received the highest light power as root port. With regard to other ports than the above-determined root port, the light power received on the port of interest is compared with the light power received on the port of other switches being connected to the port of interest via an optical link. The port having higher light power is determined as designated port. The ports other than those having been set as root port and designated port are set as blocking ports. Thus, the tree structure can be configured.

A route switchover of an optical signal transmitted from the optical root bridge and an information exchange of light power measured by an optical switch other than the optical root bridge are performed through exchanging the signal on the control plane by use of the aforementioned extended BPDU.

Further, in the embodiment having been described, the tree topology is configured by calculating the path cost based on the light power. However, it is also possible to adopt any other amount than the light power. For example, by employing a spectrum analyzer in an optical switch, an optical signal-to-noise ratio (OSNR) can be measured in the optical switch. In a system using light for a signal medium, OSNR is an important value to determine the signal quality. From that point of view, it is possible to measure OSNR in the optical switch, and use the measured value as the optical link path cost. By adopting an optical link having a satisfactory OSNR as a signal route, a tree topology of good signal quality and high system reliability can be configured. As other means for path cost evaluation, it may be possible to use a signal bit rate, a type or length of the optical fiber used as transmission medium, the number of opto-electric and electro-optical converters inserted in the middle of the transmission line, etc. It is also possible to use combination of the above two, or more.

Moreover, the embodiment of the present invention may also be applicable when a packet switch having an optical buffer for obtaining the destination of a packet through optical processing is actualized. In this case, operation using the data plane network only becomes possible, not only the two-stage configuration constituted of the control plane and the data plane having been described above. Basic operation thereof is identical to the STP of electric switches. However, as BPDU, the extended BPDU shown in FIG. 9 is adopted instead of the BPDU for electric switches, so that the optical link path cost values calculated from measured light power values are used as indexes for structuring the tree. First, the optical link path cost values are calculated by exchanging the optical configuration BPDU, which are then stored in each memory area of the switch. Next, by exchanging the configuration BPDU, a tree structure is configured. At this time, the optical link path cost obtained through exchanging the optical configuration BPDU is used as path cost. In the case of using such a packet switch, it is possible to apply the method of configuring the tree structure while calculating the optical link path costs, and the method of adopting information other than light power as optical link path cost as described above.

The foregoing description of the embodiments is not intended to limit the invention to the particular details of the examples illustrated. Any suitable modification and equivalents may be resorted to the scope of the invention. All features and advantages of the invention which fall within the scope of the invention a recovered by the appended claims.

What is claimed is:

1. A network system including a plurality of optical switches each having a plurality of ports and being capable of switching optical signal routes in the form of light, each said optical switch comprising:
    detection means for detecting an optical signal power of an optical signal passing through each port;
    control means for exchanging information of the detected optical signal power among the optical switches, calculating differences of the optical signal powers between the ports of the adjacent optical switches to each other, and controlling said each port so that a transmission route having a minimum accumulation of the calculated differences is selected from among the plurality of routes on which optical signals are transmitted, wherein
        the control means transmits and receives the information of the optical power using an extended BPDU format having an additional information field in regard to the transmission condition, being added to the bridge protocol data unit (BPDU) format of the spanning tree protocol (STP), and
        a tree topology with STP is structured through the port control by the control means.

2. The network system according to claim 1, wherein the control means exchanges the information in regard to the transmission condition via an electric signal line for transmitting electric signals, which is different from the optical signal line transmitting the optical signals.

3. A network system comprising a plurality of optical switches each having a plurality of ports and being capable of switching optical signal routes in the form of light, each said optical switch comprising:
    detection means for detecting an optical signal power of an optical signal input into each port;
    control means for exchanging information of the detected optical signal power among the optical switches, and controlling said each port so that a transmission route through which an optical signal is input into a port having received a maximum optical signal power is selected from among the plurality of routes on which the optical signals are transmitted, wherein
        the control means transmits and receives the information of the optical power using an extended BPDU format having an additional information field in regard to the transmission condition, being added to the bridge protocol data unit (BPDU) format of the spanning tree protocol (STP), and
        a tree topology with STP is structured through the port control by the control means.

4. The network system according to claim 3, wherein the control means transmits and receives the information in regard to the transmission condition via a signal line network different from the network constituting the optical signal transmission routes.

5. An optical switch having a plurality of ports and being capable of switching optical signal routes in the form of light, comprising:
    detection means for detecting an optical signal power of an optical signal passing through each port;
    control means for exchanging information of the detected optical signal power among the optical switches, calculating differences of the optical signal powers between the ports of the adjacent optical switches with each other, and controlling said each port so that a transmission route having a minimum accumulation of the calculated differences is selected from among the plurality of routes on which optical signals are transmitted, wherein
        the control means transmits and receives the information of the optical power using an extended BPDU format having an additional information field in regard to the transmission condition, being added to the bridge protocol data unit (BPDU) format of the spanning tree protocol (STP), and
        a tree topology with STP is structured through the port control by the control means.

6. The optical switch according to claim 5, wherein the control means exchanges the information in regard to the transmission condition via an electric signal line for transmitting electric signals, which is different from the optical signal line transmitting the optical signals.

7. An optical switch having a plurality of ports and being capable of switching optical signal routes in the form of light, comprising:
    detection means for detecting an optical signal power of an optical signal input into each port;
    control means for exchanging information of the detected optical signal power among the optical switches, and controlling said each port so that a transmission route through which an optical signal is input into a port having received a maximum optical signal power is selected from among the plurality of routes on which the optical signals are transmitted, wherein
        the control means transmits and receives the information of the optical power using an extended BPDU format having an additional information field in regard to the transmission condition, being added to the bridge protocol data unit (BPDU) format of the spanning tree protocol (STP), and
        a tree topology with STP is structured through the port control by the control means.

8. The optical switch according to claim 7, wherein the control means transmits and receives the information in regard to the transmission condition via a signal line network different from the network constituting the optical signal transmission routes.

9. A route setting method for an optical signal transmitted in a network system including a plurality of optical switches each having a plurality of ports and being capable of switching optical signal routes in the form of light, the method in each said optical switch comprising:

detecting an optical signal power of an optical signal passing through each port;

exchanging information of the detected optical signal power among the optical switches, calculating differences of the optical signal powers between the ports of the adjacent optical switches to each other;

controlling said each port so that a transmission route having a minimum accumulation of the calculated differences is selected from among the plurality of routes on which optical signals are transmitted, wherein the information of the optical power is transmitted and received using an extended BPDU format having an additional information field in regard to the transmission condition, being added to the bridge protocol data unit (BPDU) format of the spanning tree protocol (STP), and a tree topology with the spanning tree protocol is structured.

10. The route setting method according to claim 9, wherein the control means exchanges the information in regard to the transmission condition via an electric signal line for transmitting electric signals, which is different from the optical signal line transmitting the optical signals.

11. A route setting method for an optical signal transmitted in a network system including a plurality of optical switches each having a plurality of ports and being capable of switching optical signal routes in the form of light, the method in each said optical switch comprising:

detecting an optical signal power of an optical signal input into each port; and exchanging information of the detected optical signal power among the optical switches, and controlling said each port so that a transmission route having a minimum accumulation of calculated differences is selected from among the plurality of routes on which the optical signals are transmitted, wherein the information of the optical power is transmitted and received using an extended BPDU format having an additional information field in regard to the transmission condition, being added to the bridge protocol data unit (BPDU) format of the spanning tree protocol (STP), and a tree topology with the spanning tree protocol is structured.

12. The route setting method according to claim 11, wherein the information in regard to the transmission condition is transmitted and received via a signal line network different from the network constituting the optical signal transmission routes.

* * * * *